United States Patent
Huh et al.

(10) Patent No.: US 7,706,804 B2
(45) Date of Patent: Apr. 27, 2010

(54) APPARATUS AND METHOD FOR ALLOCATING RESOURCES IN A COMMUNICATION SYSTEM

(75) Inventors: Hoon Huh, Seongnam-si (KR); Jae-Hee Cho, Seoul (KR); In-Seok Hwang, Seoul (KR); Min-Hee Cho, Suwon-si (KR); Soon-Young Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 584 days.

(21) Appl. No.: 11/606,581

(22) Filed: Nov. 30, 2006

(65) Prior Publication Data
US 2007/0121547 A1   May 31, 2007

(30) Foreign Application Priority Data
Nov. 30, 2005   (KR) .................. 10-2005-0116011

(51) Int. Cl.
   *H04B 7/00* (2006.01)
(52) U.S. Cl. ....................... 455/450; 455/509
(58) Field of Classification Search .......... 455/450
   See application file for complete search history.

(56) References Cited

U.S. PATENT DOCUMENTS 5,621,720 A * 4/1997 Bronte et al. ............... 370/241
2002/0044555 A1 * 4/2002 Kamo et al. ............... 370/395.1
2003/0074476 A1 * 4/2003 Kim et al. ................... 709/246
2003/0104817 A1 * 6/2003 Damnjanovic .............. 455/452
2005/0157803 A1 * 7/2005 Kim et al. ................... 375/260
2005/0169229 A1 * 8/2005 Cho et al. ................... 370/344
2006/0040619 A1 * 2/2006 Cho et al. .................... 455/69
2006/0135169 A1 * 6/2006 Sampath et al. ............ 455/447
2007/0097942 A1 * 5/2007 Gorokhov et al. .......... 370/342
2007/0104087 A1 * 5/2007 Tee et al. .................... 370/208
2008/0039129 A1 * 2/2008 Li et al. ...................... 455/522
2008/0117881 A1 * 5/2008 Golitschek Edler Von Elbwart et al. ............. 370/335

FOREIGN PATENT DOCUMENTS

| KR | 1020040073551 | 8/2004 |
|---|---|---|
| KR | 1020050027563 | 3/2005 |
| KR | 1020050029081 | 3/2005 |
| KR | 1020050091591 | 9/2005 |

* cited by examiner

*Primary Examiner*—Nick Corsaro
*Assistant Examiner*—Munsoon Choo
(74) *Attorney, Agent, or Firm*—The Farrell Law Firm, LLP

(57) ABSTRACT

The present invention is provided a method for allocating uplink resources in a communication system. The method includes calculating a scheduling metric for each Mobile Station (MS), selecting an MS with a high priority according to the scheduling metric, determining a Modulation order Product coding Rate (MPR) and a number of subchannels for the selected MS, and allocating the determined MPR and the determined number of subchannels to the selected MS and updating the scheduling metric for the each MS.

56 Claims, 11 Drawing Sheets

APPARATUS AND METHOD FOR ALLOCATING RESOURCES IN A COMMUNICATION SYSTEM

PRIORITY

This application claims priority under 35 U.S.C. §119 to an application filed in the Korean Intellectual Property Office on Nov. 30, 2005 and assigned Serial No. 2005-116011, the contents of which are incorporated herein by reference.

BACKGROUND OF THE INVENTION

1. Field of the Invention

The present invention relates generally to a communication system, and in particular, to an apparatus and method for efficiently allocating resources in uplink scheduling in a Broadband Wireless Access (BWA) communication system.

2. Description of the Related Art

Provisioning of services with diverse Quality of Service (QoS) levels at about high-speed to users is an active study area for the future-generation communication system. Particularly, active research is being conducted on the development of a new communication system that supports high-speed services by ensuring mobility and QoS to Wireless Local Area Network (WLAN) supporting relatively high data rates and Wireless Metropolitan Area Network (WMAN).

Institute of Electrical and Electronics Engineers (IEEE) 802.16a and IEEE 802.16e communication systems adopt Orthogonal Frequency Division Multiplexing/Orthogonal Frequency Division Multiple Access (OFDM/OFDMA) for the physical channels of the WMAN system in order to support a broadband transmission network. Because a physical channel signal is transmitted on a plurality of subcarriers in OFDM/OFDMA in the WMAN system, IEEE 802.16a and IEEE 802.16e enable high-speed data transmission, and are in effect, OFDM/OFDMA-Broadband Wireless Access (BWA) communication systems.

IEEE 802.16a considers only a single-cell structure with no regard to mobility of Subscriber Stations (SSs). In contrast, IEEE 802.16e supports the SS' mobility to the IEEE 802.16a communication system. For the IEEE 802.16e system to ensure the mobility of SSs in a multi-cell environment, the operations of the SS and the Base Station (BS) must be modified. Particularly, handover for the SS in the multi-cell structure is under active study. Hereinafter, a mobile SS will be referred to as an MS.

FIG. 1 illustrates the configuration of a conventional BWA communication system.

Referring to FIG. 1, the BWA communication system is configured in a multi-cell structure. Thus, it includes cells 100 and 150, a BS 110 that covers the cell 100, a BS 140 that covers the cell 150, and a plurality of MSs 111, 113, 130, 151 and 153. Signaling between the BSs 110 and 140 and the MSs 111, 113, 130, 151 and 153 is based on OFDM/OFDMA.

In OFDMA proposed for the BWA communication system, subchannels are composed of subcarriers that constitute one OFDM symbol, and a plurality of OFDM symbols form one frame.

FIG. 2 illustrates the structure of a data frame in the conventional BWA communication system. Particularly, the data frame is an Uplink (UL)/Downlink (DL) frame for an Orthogonal Frequency Division Multiple Access-Time Division Duplex (OFDMA-TDD) BWA communication system.

Referring to FIG. 2, the data frame is divided into a DL frame and a UL frame in time. A Transmit/receive Transition Gap (TTG) is interposed for transition from the downlink to the uplink and a Receive/transmit Transition Gap (RTG) is interposed for transition from the uplink to the downlink. The horizontal axis represents OFDMA symbol numbers and the vertical axis represents the logical numbers of subchannels.

On the downlink, a preamble resides in a $K^{th}$ OFDMA symbol, for synchronization acquisition, and data information broadcast commonly to MSs such as a Frame Control Header (FCH) and a DL-MAP is located in a $(K+1)^{th}$ OFDMA symbol.

The preamble delivers a synchronization signal, i.e. a preamble sequence by which synchronization is acquired between a BS and an MS. That is, the preamble is required for the MS to acquire synchronization to data transmitted by the BS. The MS extracts the synchronization information from the preamble through its MODEM.

The FCH is composed of two subchannels, carrying basic information about subchannels, ranging and modulation. An analysis of the FCH reveals the size of the DL-MAP and the frequency reuse factor (referred to as reuse) of the BS, for example, reuse 1 or reuse 3.

The DL-MAP delivers a DL-MAP message. It has information required for data extraction and service provisioning to MSs, such as the positions and sizes of data in the DL frame. Therefore, data can be extracted from the DL frame by analyzing the DL-MAP information.

In $(K+3)^{th}$ through $(K+15)^{th}$ OFDMA symbols, Downlink bursts (DL bursts) are positioned, for example, DL burst #1 to DL burst #6. Data is extracted from the DL bursts based on general data information, such as information acquired from the DL-MAP.

On the uplink, Uplink bursts (UL bursts), UL burst #1 to UL burst #5 are located in $(K+17)^{th}$ to $(K+26)^{th}$ OFDMA symbols. A Ranging Subchannel also occupies the $(K+17)^{th}$ to $(K+26)^{th}$ OFDMA symbols. Data is extracted from the UL bursts based on general data information such as information acquired from an Uplink MAP (UL-MAP) delivered in DL burst #1.

Each subchannel is composed of a plurality of subcarriers. Depending on system situation, a number of subcarriers form one subchannel. As described above, the IEEE 802.16e OFDMA communication system configures subchannels each being a set of subcarriers according to system situation and allocates resources to a plurality of users (i.e. MSs) by the subchannels.

FIG. 3 illustrates traffic transmission in the conventional BWA communication system. Particularly, a BS 350 allocates uplink resources to, for example, an MS 320 that transmits traffic using the allocated resources.

Referring to FIG. 3, the BS 350 selects an MS (e.g. the MS 320) to allocate resources to from among MSs 310, 320 and 330 in its coverage area by a scheduling procedure. The BS 350 determines the amount of resources and a Modulation and Coding Scheme (MCS) for the MS 320. Also, the BS 350 determines the position of the resources by which the MS 320 will transmit data. This operation is repeated until all uplink resources are allocated.

After the scheduling is completed, the BS 350 broadcasts uplink scheduling information indicating the result of the scheduling in a UL-MAP message to all the MSs 310, 320 and 330 in the cell.

The MSs 310, 320 and 330 receive the UL-MAP message and, if resources have been allocated to them, transmit traffic at the positions of the allocated resources on the uplink. For example, if the UL-MAP message indicates the existence of resources allocated to the MS 320, the MS 320 transmits uplink traffic at the position of the allocated resources.

Basically, the BS seeks to maximize radio channel throughput and minimize the transmission delay of traffic in uplink scheduling. The BS aims to reduce interference with neighbor sectors, reduce UL-MAP overhead, expand cell coverage, reduce the power consumption of the MSs and maintain stable link performance between the BS and the MSs. Thus, the BS selects an operation algorithm that serves the above purposes. However, some objectives of the BS scheduling may be contradictory to one another. Hence, the scheduler of the BS attempts to fulfill the objectives appropriately according to their priority levels by adjusting parameters such as an MCS level preference and the amount of resources allocated per time.

Yet, there is no specified scheduling method and apparatus for satisfying the foregoing objectives in allocating uplink resources through frame-basis uplink scheduling in a broadband mobile communication system, particularly an OFDMA-TDD mobile communication system.

SUMMARY OF THE INVENTION

An object of the present invention is to substantially solve at least the above problems and/or disadvantages and to provide at least the advantages below. Accordingly, the present invention provides an apparatus and method for efficiently allocating resources in uplink scheduling in a communication system.

The present invention provides an apparatus and method for efficiently allocating uplink resources in a communication system and using uplink bandwidth resources by utilizing the power headrooms or downlink Signal to Interference and Noise Ratios (SINRs) of MSs in a communication system.

The present invention provides an apparatus and method for allocating resources and determining an MCS level-subchannel number/bandwidth combination in order to reduce the power consumption of MSs and interference with neighbor cells through efficient resource allocation in uplink scheduling in a communication system.

According to the present invention, there is provided a method for allocating uplink resources in a communication system. The method includes calculating a scheduling metric for each Mobile Station (MS), selecting an MS with a high priority according to the scheduling metric, determining a Modulation order Product coding Rate (MPR) and a number of subchannels for the selected MS, and allocating the determined MPR and the determined number of subchannels to the selected MS and updating the scheduling metric for the each MS.

According to the present invention, there is provided a method for allocating uplink resources in a communication system. The method includes updating input variables required for scheduling and a scheduling metric for each Mobile Station (MS) in every frame, selecting an MS maximizing the scheduling metric and allocating band resources to the selected MS, determining a combination of a Modulation and Coding Scheme (MCS) level and a number of subchannels corresponding to a Modulation order Product coding Rate (MPR) for the allocated band resources according to the input variables, and allocating the determined MCS level and the determined number of subchannels to the selected MS.

According to the present invention, there is provided a method for allocating uplink resources in a communication system. The method includes calculating a scheduling metric for each Mobile Station (MS), selecting an MS with a high priority according to the scheduling metric, determining a Modulation order Product coding Rate (MPR) and a number of subchannels according to a location of the selected MS in a cell, and allocating the determined MPR and the determined number of subchannels to the selected MS and updating the scheduling metric for the each MS.

According to the present invention, there is provided an apparatus for allocating uplink resources in a communication system. The apparatus includes an input variable processor for updating input variables required for scheduling using signaling messages received in each frame, a resource amount calculator for calculating an amount of resources required for control channels according to the input variables received from the input variable processor, a resource allocator for determining an amount and position of resources to be allocated according to the input variables received from the input variable processor and the resource amount received from the resource amount calculator and allocating the resources to the control channels and traffic channels according to the position, a metric processor for calculating a scheduling metric, that prioritizes Mobile Stations (MSs) for scheduling, according to a fairness level and whether downlink channel information is utilized, a selector for prioritizing the MSs according to the scheduling metric and selecting an MS to be allocated resources according to the priority, and a subchannel number and Modulation order Product coding Rate (MPR) decider for determining the number of subchannels and an MPR for resources to be allocated to the selected MS according to the input variables received from the input variable processor.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

The present invention provides apparatus and method for an uplink scheduling in a communication system, for example, a Broadband Wireless Access (BWA) communication system. The present invention provides an apparatus and method for efficiently allocating resources in uplink scheduling in an Orthogonal Frequency Division Multiplexing (OFDM) communication system.

The present invention as described later provides an apparatus and method for determining a combination of a Modulation and Coding Scheme (MCS) level, the number of subchannels and a bandwidth in uplink scheduling in an OFDM communication system. The determination is made based on the power headroom or downlink Signal-to-Interference and Noise Ratio (SINR) of Mobile Stations (MSs), thereby efficiently utilizing uplink bandwidth resources and thus reducing the power consumption of the MSs and interference with neighbor cells.

Further disclosed is an uplink scheduling apparatus and method suitable for the OFDM communication system. An MS with a high channel gain at a given time instant is selected using downlink channel information for uplink scheduling, resources are fairly distributed to MSs according to the amounts of resources allocated to the MSs and their throughputs, and resources are efficiently allocated by the uplink scheduling.

While the following description is made in the context of an Institute of Electrical and Electronics Engineers (IEEE) 802.16 communication system, for the sake of convenience, to which the present invention is not limited, it is to be clearly understood that the present invention is applicable to any other communication system.

Figure 1:
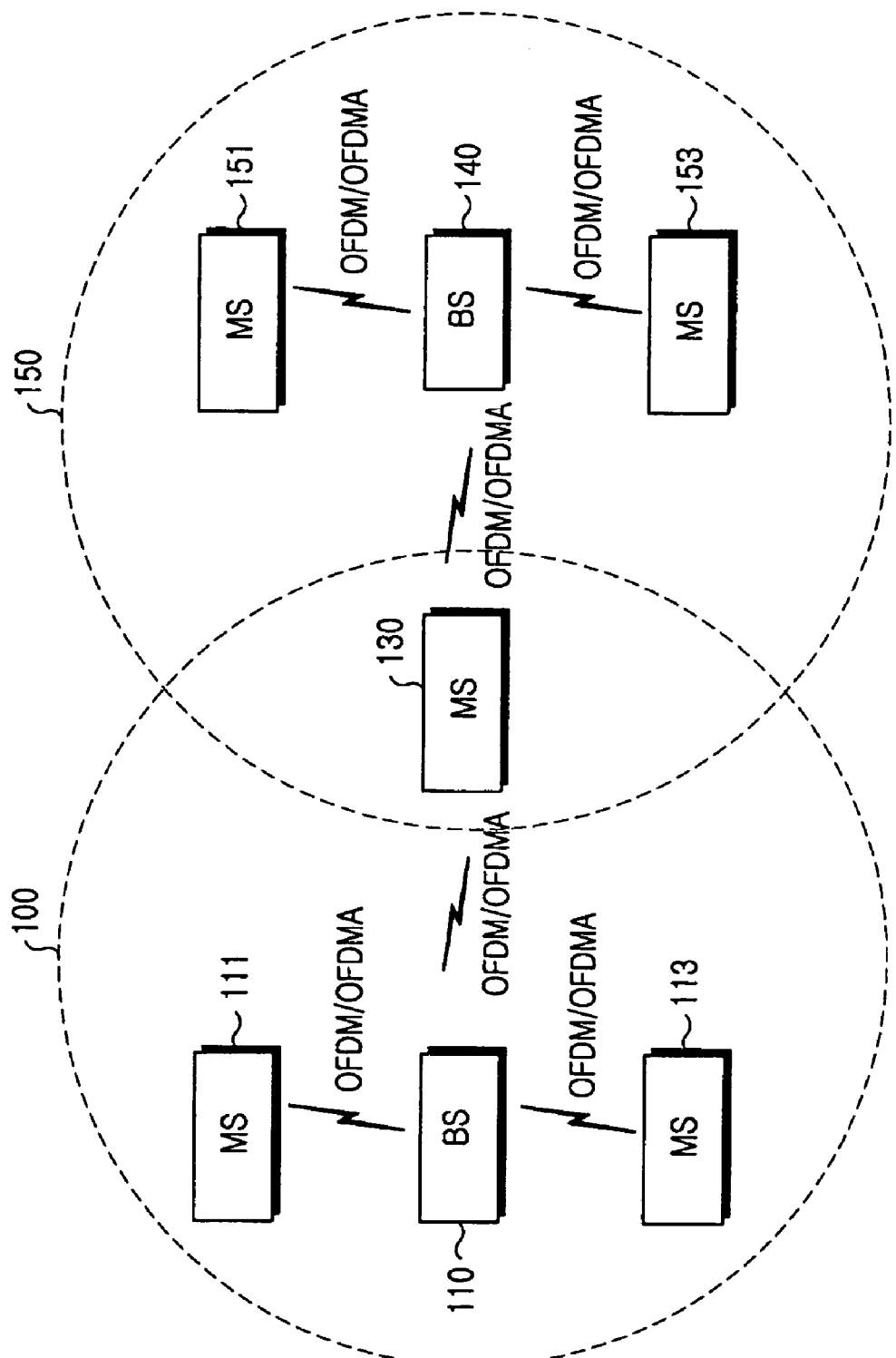
FIG. 1 illustrates the configuration of a conventional BWA communication system.
Figure 2:
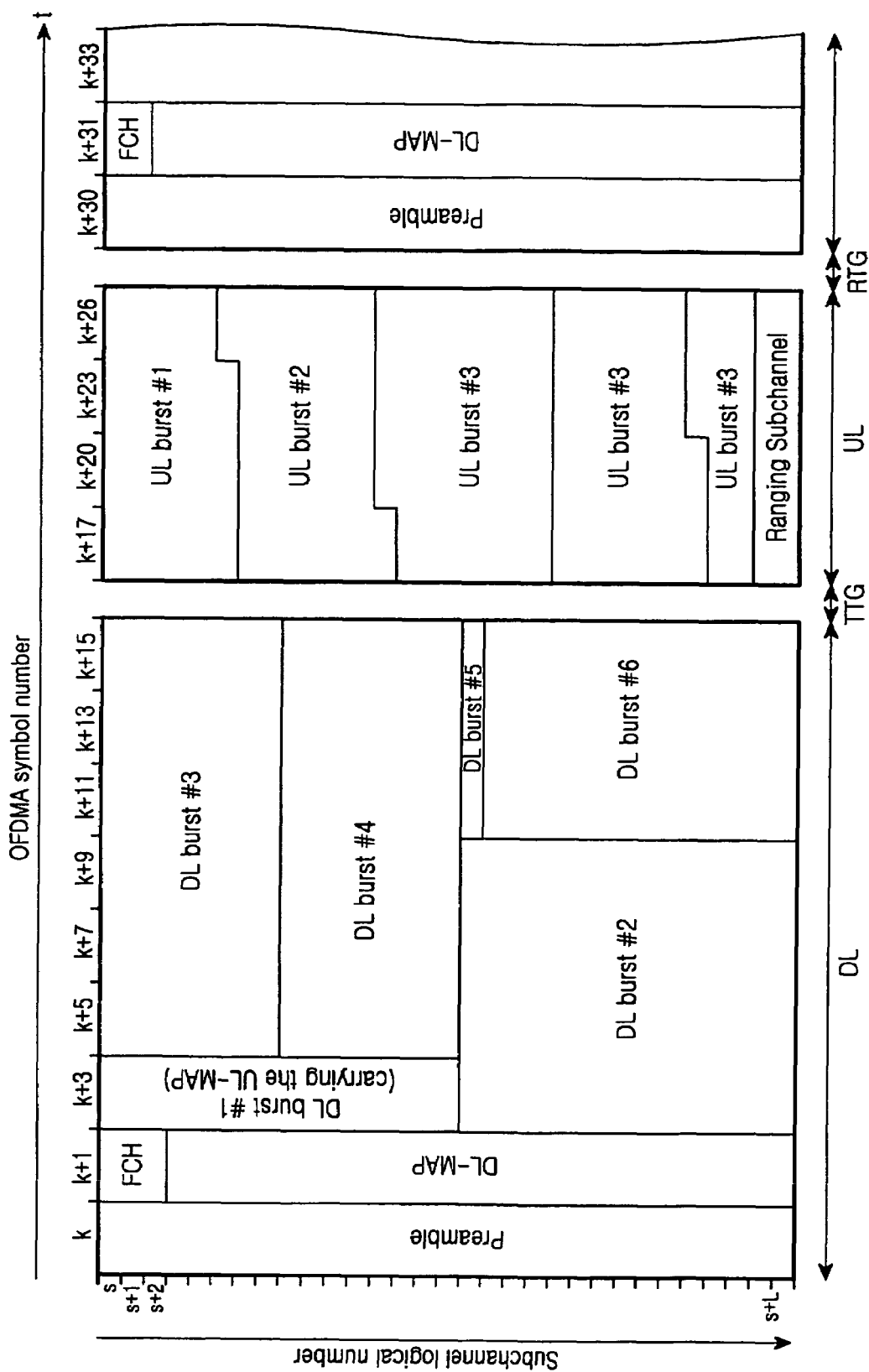
FIG. 2 illustrates a frame structure in the conventional BWA communication system.
Figure 3:
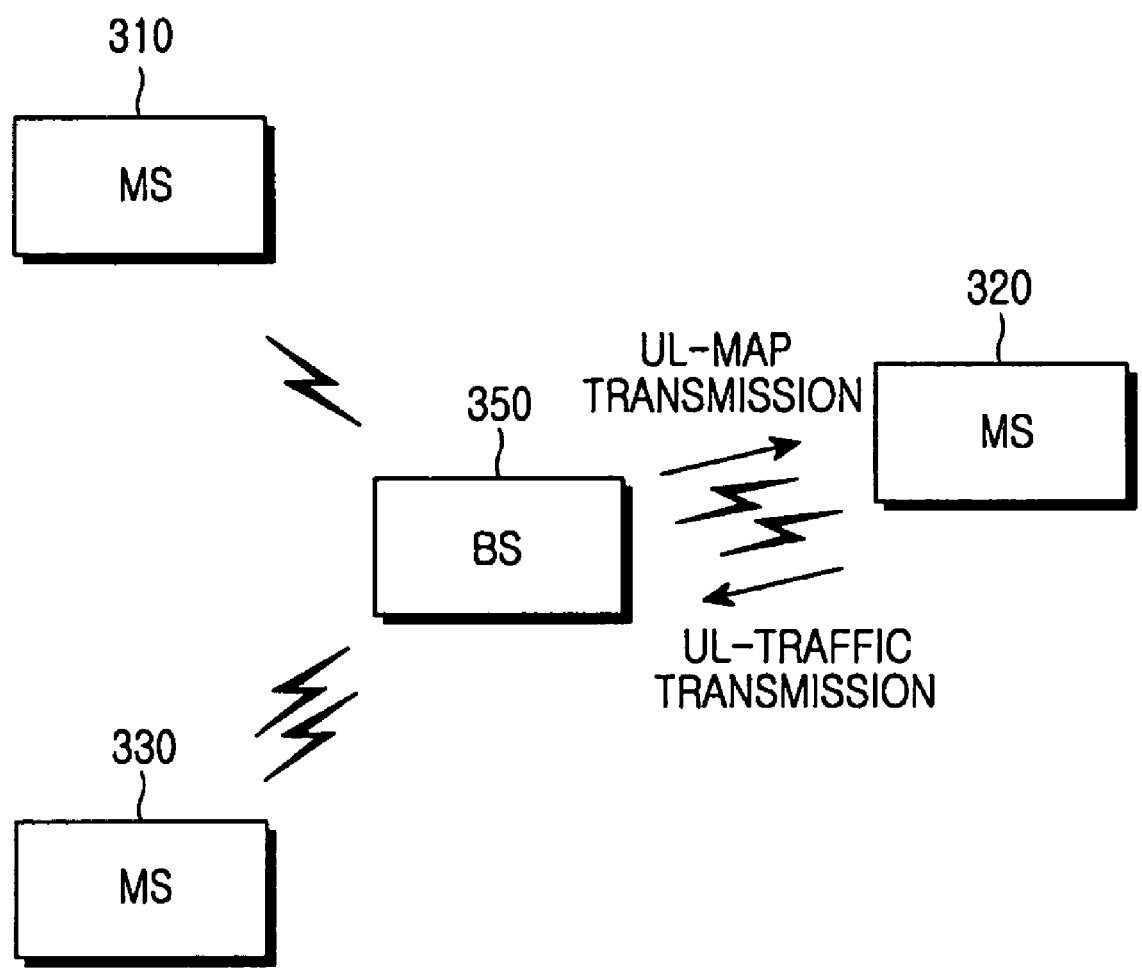
FIG. 3 illustrates uplink traffic transmission in the conventional BWA communication system.
Figure 4:
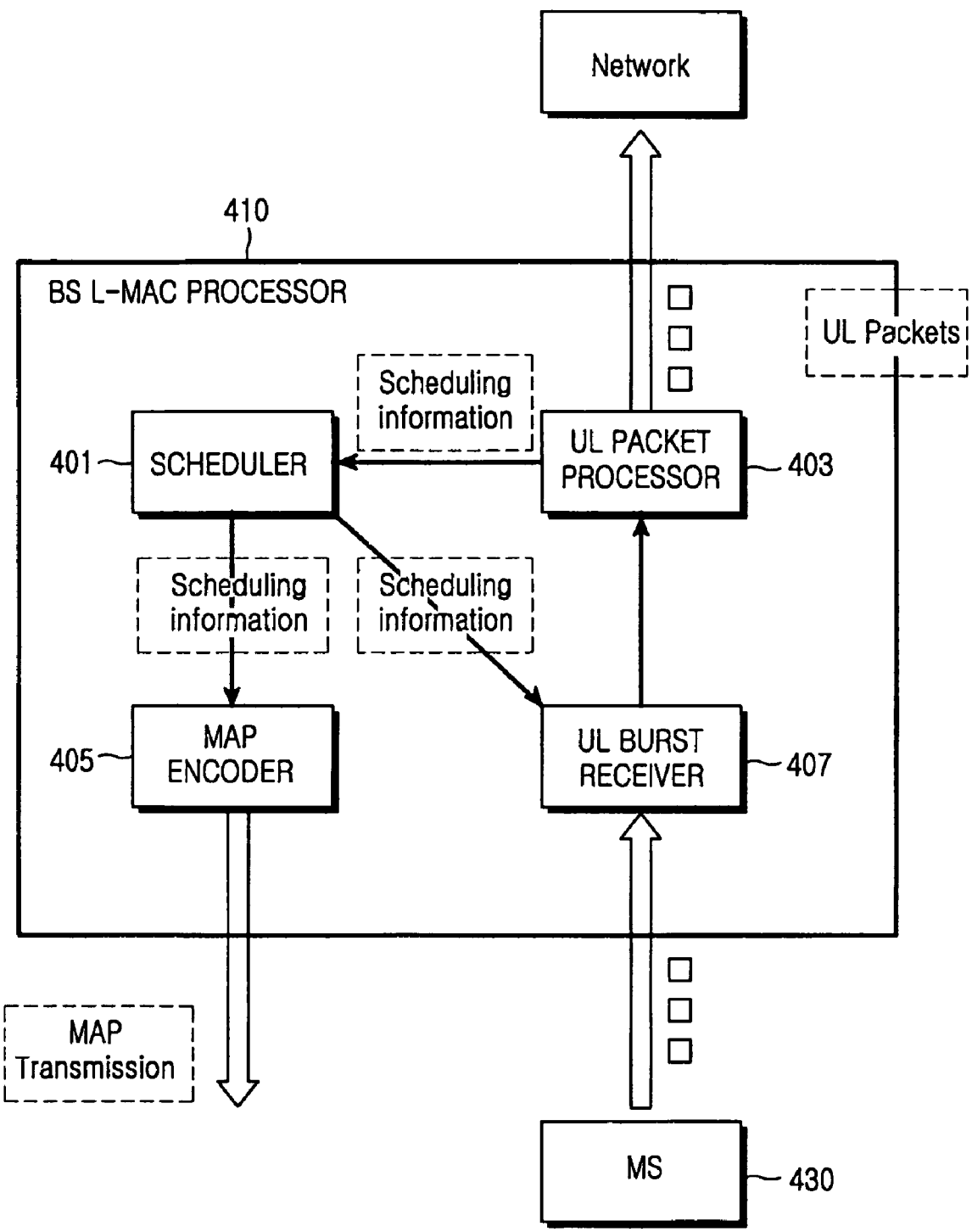
FIG. 4 is a block diagram of a scheduling apparatus in a communication system according to the present invention.

FIG. 4 is a block diagram of an uplink scheduling apparatus in a communication system according to the present invention. The scheduling apparatus is a BS uplink Low Media Access Control (L-MAC) processor including a scheduler.

Referring to FIG. 4, a BS uplink L-MAC processor 410 includes a scheduler 401, an UpLink (UL) packet processor 403, a MAP encoder 405 and a UL burst receiver 407.

In operation, the UL burst receiver 407 receives a data burst from an MS 430 and recovers the data burst to a packet form.

The packet processor 403 classifies the packet received from the UL burst receiver 407 as a traffic packet or a signaling message (e.g., a MAC message). When classified as a traffic packet, the packet processor 403 transmits the traffic packet to a network. When classified as a signaling message, the packet processor 403 acquires scheduling information required for scheduling of the MS 430 by interpreting the signaling message and provides the scheduling information to the scheduler 401. In each frame, the packet processor 403 acquires messages required for scheduling by interpreting MAC messages and provides them to the scheduler 401.

The scheduler 401 selects the MS 430 to allocate uplink resources to using the scheduling information received from the packet processor 403. Then the scheduler 401 determines scheduling information including the amount and position of the resources and an MCS level and transmits the scheduling information to the UL burst receiver 407 and the MAP encoder 405.

The MAP encoder 405 converts the scheduling information to a UL-MAP message that it transmits to the MS 430.

The UL burst receiver 407 stores the scheduling information and processes a data burst from the MS 403 based on the scheduling information when the MS 430 transmits the data burst.

Figure 5:
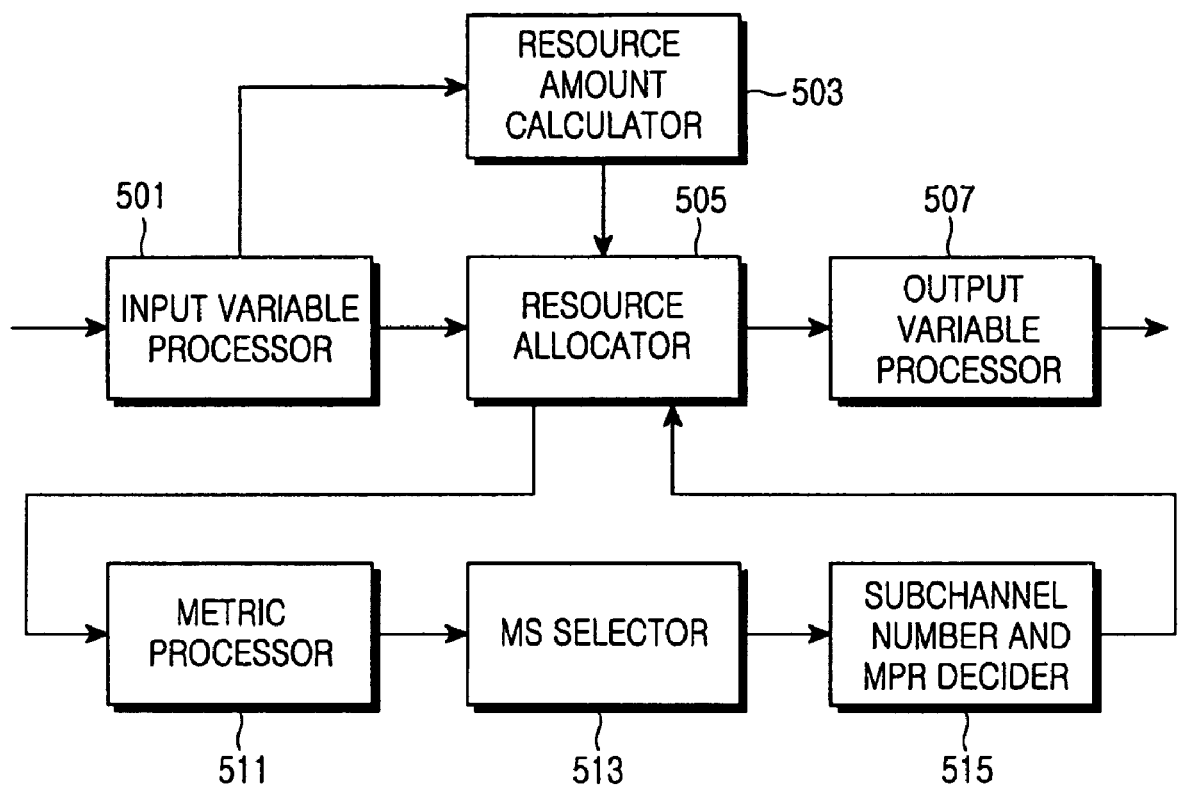
FIG. 5 is a block diagram of a scheduler in the communication system according to the present invention.

FIG. 5 is a block diagram of the uplink scheduler according to the present invention.

Referring to FIG. 5, the scheduler includes an input variable processor 501, a resource amount calculator 503, a resource allocator 505, an output variable processor 507, a metric processor 511, an MS selector 513 and a subchannel number and Modulation order Product coding Rate (MPR) decider 515.

The input variable processor 501 receives signaling messages (e.g., MAC messages) in each frame from the packet processor 403 illustrated in FIG. 4, and updates input variables for scheduling of the scheduler based on the MAC messages.

Specifically, the packet processor 403 classifies messages required for scheduling by interpreting MAC messages in each frame and provides the messages to the scheduler. Thus, the input variable processor 501 updates the input variables including the number of control channels needed for scheduling, and a power headroom, queue size, MPR, throughput, and the number of allocated subchannels for each MS according to the received messages, and provides the processed input variables to the resource amount calculator 503 and the resource allocator 505. The input variables will be described below in detail.

The resource amount calculator 503 calculates the amount of resources required for control channels in correspondence with the number of control channels notified by the input variable processor 501.

The resource allocator 505 determines the amounts and positions of resources to be allocated according to the input variables received from the input variable processor 501 and the calculated resource amount received from the resource amount calculator 503. Then the resource allocator 505 actually allocates the resources to control channels and traffic channels in correspondence with the amounts and positions of resources.

The metric processor 511 calculates a metric that prioritizes MSs for scheduling. The metric is calculated in a schemes depending on a fairness level and whether downlink channel information is utilized.

The MS selector 513 prioritizes the MSs according to the metric and selects an MS to allocate resources to according to the priority.

The subchannel number and MPR decider 515 determines the number of subchannels and an MPR for the resources to be allocated to the selected MS by a scheduling algorithm. An MPR is the product of a modulation order and a coding rate. Specifically, the subchannel number and MPR decider 515 makes the determination according to an SINR or Carrier-to-Interference and Noise Ratio (CINR) requirement and a headroom requirement of each MPR.

The output variable processor 507 processes variables decided by scheduling, i.e. the Identifier (ID) of the selected MS, the number of subchannels allocated to the MS and the MCS level for the MS in the form of an actual message.

The input variables used in the uplink scheduler according to the present invention are defined as follows.

The input variables are Power headroom (Headroom), Normalized headroom (Headroom_nor), MPR, Queue size (Queue_Size), Normalized bandwidth, Normalized bandwidth allocation (Alloc_Nor_BW), the number of instant allocated subchannels (Inst_Alloc_Sch), the average number of allocated subchannels (Avg_Alloc_Sch), Instant throughput (Inst_Throughput), Average throughput (Avg_Throughput), downlink Channel Quality Indicator (CQI) from each MS, Instant downlink SINR (Inst_DL_SINR) and Average downlink SINR (Avg_DL_SINR).

Power headroom (Headroom): power headroom when the MS transmits a data burst at a current MCS level using a current number of subchannels.

Normalized headroom (Headroom_nor): power headroom as which the power headroom information is calculated with respect to an MCS level and a number of subchannels, for example, Quadrature Phase Shift Keying (QPSK), coding rate R=½, and one subchannel. If $N_{Headroom}$ subchannels are used when the power headroom information is transmitted, the Normalized headroom is increased by $N_{Headroom}$ relative to the power headroom because the concept of the Normalized headroom is based on the assumption that the number of subchannels is 1. Also, the Normalized headroom increases by the difference between an SINR requirement ($SINR_{MCS}$) for an MCS level used when the power headroom is measured and an SINR requirement ($SINR_{QPSK,R=1/2}$) for QPSK and R=½. This relationship is expressed in Equation (1) in terms of dB as Headroom_nor[dB]=Headroom+10 log10 $(N_{Headroom})$+SINR$_{MCS}$-SINR$_{QPSK,R=1/2}$ (1)

MPR: the product of a modulation order and a coding rate, calculated according to an MCS level used for the MS. For example, given a modulation order of 2, i.e. QPSK and R=½, the MPR is 1. For a modulation order of 4, i.e. 16-ary Quadrature Amplitude Modulation (16QAM) and R=¾, the MPR is 3.

Queue size (Queue_Size): the amount of data buffered in a transmission buffer for each MS, estimated by the scheduler. The Queue size increases/decreases depending on a bandwidth request from the MS and the scheduling result. If the bandwidth request is transmitted, the Queue size is increased according to the bandwidth request. If resources are allocated by the scheduler, the Queue size is reduced as much as the allocated resources.

Normalized bandwidth: the number of subchannels required for transmission in QPSK at R=½, for example. According to the IEEE 802.16 standards, 1 normalized bandwidth is equivalent to 48 bits.

Normalized bandwidth allocation (Alloc_Nor_BW): a normalized bandwidth allocated to the MS by scheduling. The actual number of required subchannels is Alloc_Nor_BW/MPR.

the number of instant allocated subchannels (Inst_Alloc_Subch): the actual number of subchannels allocated to the MS at a scheduling time instant.

Average number of allocated subchannels (Avg_Alloc_Subch): the moving average of Inst_Alloc_Subch for frames corresponding to a moving average time constant T_avg. The moving average is to sum the moving average of previous T frames counted from one frame before the present and the current new input after weighting them with (T−1)/T and 1/T, respectively in order to approximate the average of the T current and previous frames. In Equation (2), $$\text{Avg\_Alloc\_Subch}[n] = \frac{T\_avg - 1}{T\_avg} \cdot \text{Avg\_Alloc\_Subch}[n-1] + \frac{1}{T\_avg} \cdot \text{Inst\_Alloc\_Subch} \quad (2)$$

where n denotes a scheduling time index that increases each time scheduling is performed.

Inst_Throughput: the amount of data allocated to the MS at a scheduling time, expressed as a normalized bandwidth allocation value. If no resources are allocated, the instant throughput is 0.

Avg_Throughput: the moving average throughput for each MS for frames corresponding to the moving average time constant T_avg, as expressed in Equation (3):

$$\text{Avg\_Throughput}[n] = \frac{T\_avg - 1}{T\_avg} \cdot \text{Avg\_Throughput}[n-1] + \frac{1}{T\_avg} \cdot \text{Inst\_Throughput} \quad (3)$$

where n denotes a scheduling time index that increases each time scheduling is performed.

Downlink CQI for each MS: a CQI updated with a CQI received on an uplink CQI Channel (CQICH) allocated to the MS so that the MS reports the SINR or CINR measurement of a downlink channel.

Instant downlink SINR (Inst_DL_SINR): the SINR of a downlink channel, calculated from the CQICH.

Average downlink SINR (Avg_DL_SINR): the moving average SINR of Inst_DL_SINR for frames corresponding to a time constant T_DL, as expressed in Equation (4):

$$\text{Avg\_DL\_SINR}[n] = \frac{T\_avg - 1}{T\_avg} \cdot \text{Avg\_DL\_SINR}[n-1] + \frac{1}{T\_avg} \cdot \text{Inst\_DL\_SINR} \quad (4)$$

where n denotes a scheduling time index that increases each time scheduling is performed.

Figure 6:
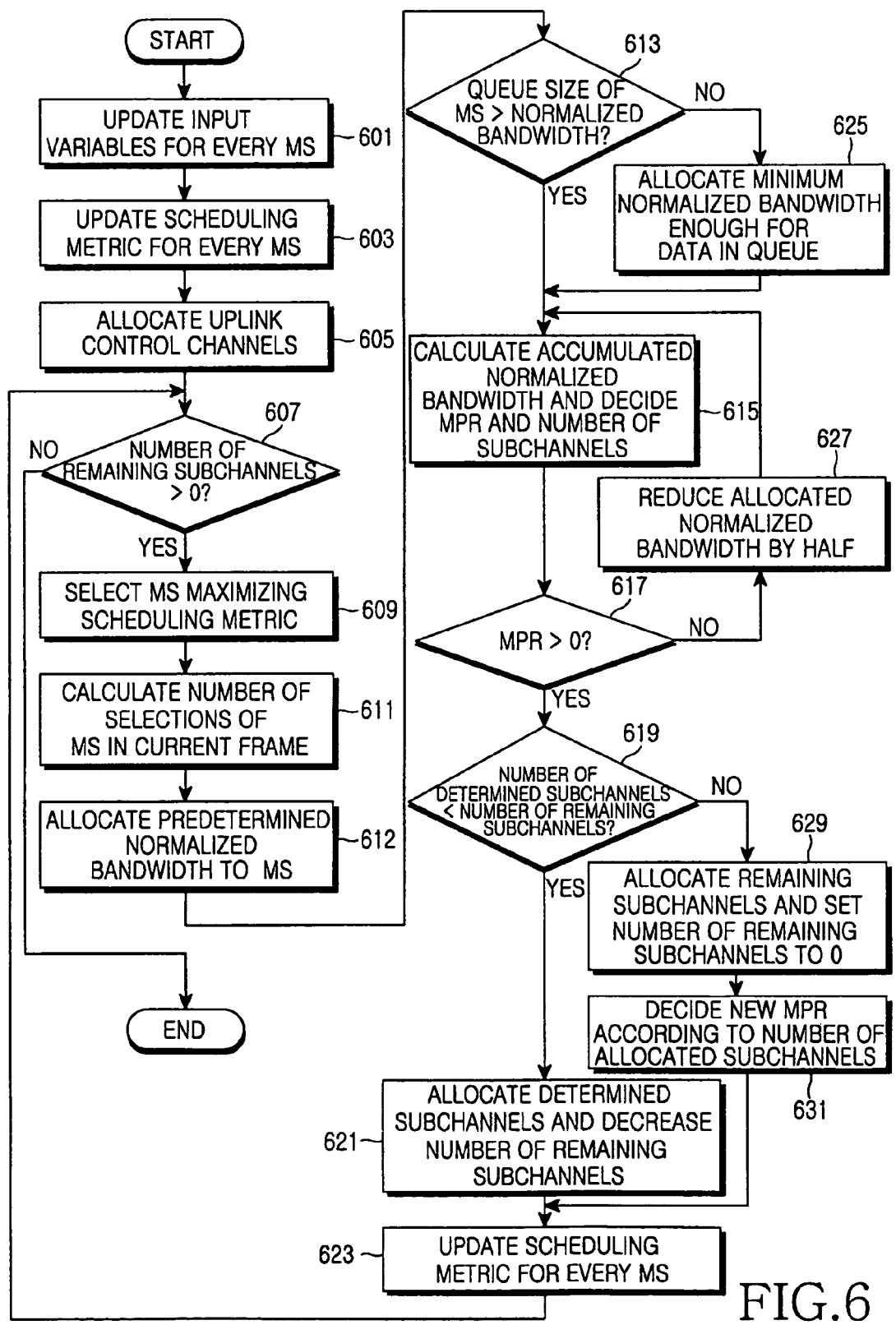
FIG. 6 is a flowchart illustrating an uplink scheduling operation in the communication system according to the present invention.

FIG. 6 is a flowchart illustrating an uplink scheduling operation in the communication system according to the present invention.

In accordance with the uplink scheduling method, MSs are prioritized using the above-described input variables, MSs are selected according to the priority, for scheduling, and MCS levels, the amounts of resources to be allocated, and the positions of the resources are determined for the MSs. This procedure will be described below in detail.

1. Update Scheduler Input Variables for Each MS (step 601)

In step 601, the scheduler receives MAC messages in each frame and updates the input variables based on the MAC messages. Specifically, the scheduler updates the input variables including the number of control channels required for scheduling, and a power headroom, queue size, MPR, throughput, and the number of allocated subchannels for each MS.

2. Update Scheduling Metric for Each MS (step 603).

In step 603, a scheduling metric is updated on an MS basis. The scheduler metric serves as a criterion to prioritize MSs to be allocated resources. The scheduling metric is designed such that priority is given to an MS with a high channel gain at a given scheduling time instant in scheduling using channel information, thereby increasing cell throughput and fair distribution of resources according to the amounts of resources allocated to the MSs and their throughputs. The scheduler updates the scheduling metric for each MS according to the latest scheduler input variables and the latest scheduling result at each scheduling time.

3. Allocate Uplink Control Channels (step 605)

In step 605, allocation of uplink control channels for signaling and transmitting control signals precedes traffic scheduling.

4. Select MSs for Scheduling and Allocate Default Normalized Bandwidth (step 607 through step 611)

In step 607, the scheduler determines whether the remaining resources, i.e. the number of the remaining subchannels after the control channel allocation is 0. If the number of the remaining subchannels is not 0, the scheduler selects an MS that maximizes the scheduling metric in step 609 and counts the number of selections of the MS in the current frame in step 611.

More specifically, the remaining resources from allocating resources to the control channels are allocated to traffic channels by scheduling. An MS that maximizes the scheduling metric is selected and a normalized bandwidth is allocated to the MS. If resources remain, another MS maximizing the scheduling metric is selected and a subchannel is allocated to the MS. This operation is repeated until no resources remain. In this scheme, scheduling is performed on the basis of a predetermined bandwidth using the Normalized bandwidth according to an MCS level and the number of subchannels, thereby facilitating fairness among the MSs, scheduler flexibility, and efficient decision of the MPR and the number of subchannels.

5. Process When MS Is Selected Two or More Times in Frame Scheduling Period (step 612)

When an MS is selected two or more times during one frame scheduling period, the scheduler newly determines an MPR and the number of subchannels by combining normalized bandwidth resources allocated to the MS, neglecting the previously determined MPR and number of subchannels for the MS in step 612.

The MS is allocated a normalized bandwidth corresponding to the number of subchannels preset by the system, N_sch_default each time the MS is selected. If the MS is selected N_sel times, it eventually gets N_sel×N_sch_default normalized bandwidths. If the MS gets two or more normalized bandwidths, i.e. the MS is selected two or more times during one frame scheduling period, the previous MPR and number of subchannels allocated to the MS are neglected and instead, an MPR and the number of subchannels are newly determined for the MS in correspondence with the final allocated normalized bandwidths.

The allocated normalized bandwidth does not refer to the number of physical subchannels but the right to be allocated resources for transmitting particular data. Actually allocated resources can be determined in various schemes, considering the numbers of subchannels and MCS levels in combination. For example, if 10 normalized bandwidths are allocated, 10 subchannels are actually allocated in QPSK and R=½, or 5 subchannels in 16QAM and R=½.

6. Process When Queue Size of Selected MS Is Smaller Than Allocated Normalized Bandwidth Resources (steps 613 and 625)

In step 613, the scheduler compares the queue size of the selected MS with the final normalized bandwidth allocated in step 612. If the queue size is smaller than the allocated normalized bandwidth, the scheduler allocates a minimum normalized bandwidth enough to transmit the data of the queue in step 625.

7. Extract Pair of Number of Subchannels and MPR Based On Headroom (step 615)

If the queue size is larger than the allocated normalized bandwidth in step 613, the scheduler calculates the accumulated normalized bandwidth for the current frame and determines an MPR with respect to the normalized bandwidth value. The scheduler determines a combination of an MPR and the number of subchannels according to the MPR. Even through the same normalized bandwidth is allocated according to a combination of an MCS level and the number of subchannels determined by the scheduler, the power consumption of the MS and the amount of resources available to the BS vary. Hence, an appropriate MPR-subchannel number combination is found within a headroom-supported range according to the scheduler algorithm. If the current allocated normalized bandwidth cannot be supported by any MPR-subchannel number combination with a headroom above the headroom requirement, the MPR is set to 0.

For example, if an MCS level with an MPR of p is selected for N allocated normalized bandwidths, N/p subchannels are required. Since data is transmitted in a narrower bandwidth in a higher MPR, frequency efficiency increases with MPR. Hence, when an MCS level with a higher MPR is selected for the same amount of data, the number of required subchannels is reduced. As a consequence, subchannels can be allocated to more MSs and sector throughput increases. However, high MCS level leads to poor link efficiency and thus more power is consumed in transmitting the same amount of data. Therefore, the power consumption of MSs and interference with neighbor sectors are increased.

However, if an MCS level with a low MPR is selected, the power consumption of a corresponding MS is reduced and interference with neighbor sectors is decreased. Yet, more subchannels are required for each MS, thereby limiting the amount of available uplink resources.

Accordingly, an MCS level and the number of subchannels are determined considering the location of an MS in a cell, for efficient selection of a pair of a subchannel number and an MPR-based MCS level.

Figure 7:
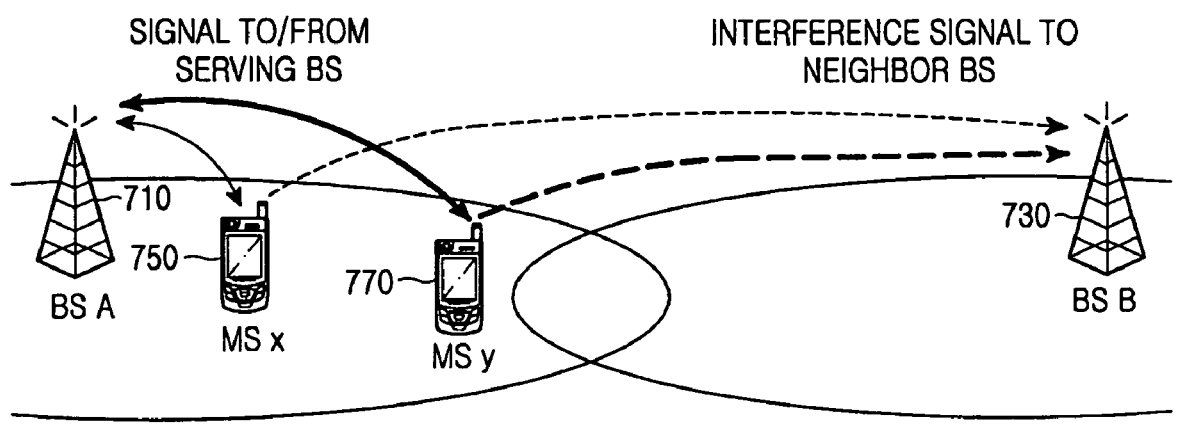
FIG. 7 illustrates an operation for determining an MCS level and the number of subchannels according to the location of an MS in the communication system according to the present invention.

FIG. 7 illustrates the configuration of a communication system for determining an MCS level and the number of subchannels according to the location of an MS according to the present invention.

Referring to FIG. 7, an MS 750 (MS x) near to a BS, for example, a BS 710 (BS A), i.e. at a center of a cell managed by BS A requires less power than an MS 770 (MS y) at a boundary of the cell in transmitting the same amount of data. Besides the high power requirement compared to MS x, MS y highly interferes with a neighbor BS 730 (BS B) because it is in the vicinity of BS B.

Accordingly, BS A allocates an MCS level with a high MPR representing low link efficiency to MS x. This allocation does not affect MS x and BS A. BS A allocates an MCS level with a low MPR representing high link efficiency to MS y. Since MS y consumes more power than MS x, it is preferable to allocate the MCS level with a low MPR in accordance with the power consumption.

In this context, an MPR and an MCS level-subchannel number combination based on the MPR are adaptively decided in accordance with the location of an MS in a cell in the present invention. Specifically, an MCS level with a high MPR is allocated to an MS at the center of the cell, thus reducing the number of subchannels allocated to the MS. Conversely, an MCS level with a low MPR is allocated to an MS at the boundary of the cell, thus increasing the number of subchannels allocated to the MS. In order to derive an MCS level-subchannel number combination according to the location of an MS, the present invention also provides a method of locating the MS in the cell, which will be described in detail with reference to FIGS. 9 and 10.

Figure 8:
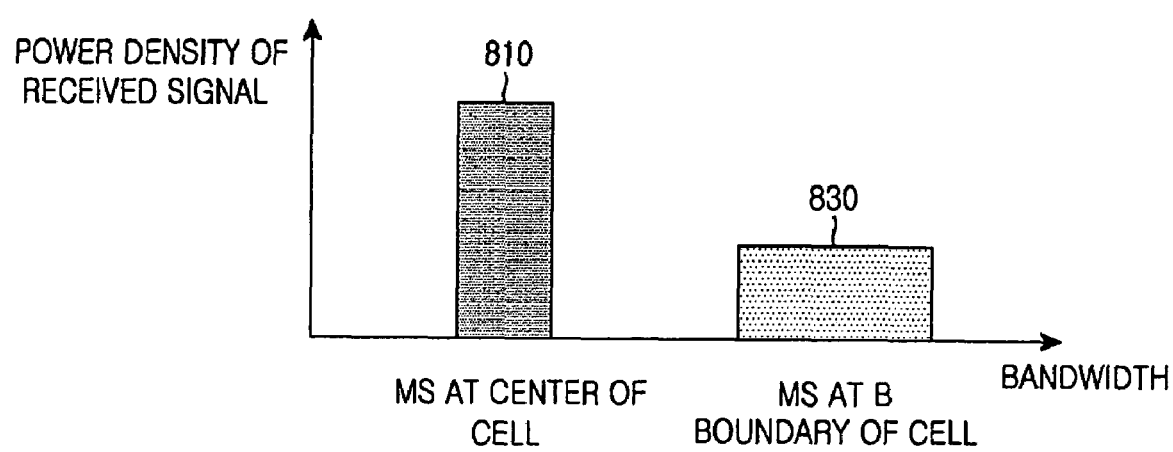
FIG. 8 illustrates frequency power density observed in an MCS level-subchannel allocation method in the communication system according to the present invention.

FIG. 8 illustrates frequency power density observed in the MCS level-subchannel allocation method in the communication system according to the present invention.

Referring to FIG. 8, an MS at the center of a cell as illustrated in FIG. 7 is allocated an MCS level with a high frequency efficiency, i.e. an MCS level with a high MPR. Thus, the MS uses a narrow bandwidth and demonstrates a high received power density, as indicated by reference numeral 810. An MS at the boundary of the cell is allocated an MCS level with a high power efficiency, i.e. an MCS level with a low MPR. Thus, this MS uses a wide bandwidth and demonstrates a low received power density, as indicated by reference numeral 830.

Since signals with the high power density 810 experience higher attenuation in a neighbor cell, an interference signal received in the neighbor cell shows a flat spectrum and the phenomenon of creating interference in a particular band is relieved.

8. Reduce Number of Allocated Subchannels When Headroom Shortage Exists (steps 617 and 627)

In step 617, the scheduler checks the MPR determined in step 615. If the MPR is equal to or less than 0, i.e. if the MPR calculated for the normalized bandwidth according to the headroom is 0 in step 615, which implies the headroom is less than a threshold, the scheduler detects a transmittable normalized bandwidth by reducing the normalized bandwidth by half each time in step 627.

9. Process When There Are Fewer Remaining Subchannels than Allocated Subchannels (steps 619, 629 and 631)

If the MPR is larger than 0 in step 617, in step 619 the scheduler compares the number of the remaining subchannels with that of subchannels decided (i.e. allocated) in step 615. If fewer subchannels remain than the allocated subchannels, the scheduler allocates the remaining subchannels to the selected MS and sets a variable indicating the number of the remaining subchannels to 0 in step 629. In step 631, the scheduler determines a new MPR with respect to the number of the allocated subchannels. That is, the number of allocated subchannels and Inst_Alloc_Subch are set to the number of the remaining subchannels and the MPR is changed to a maximum available value. Importantly, the MPR shall be a minimum MPR enough for transmitting in the normalized bandwidth that was allocated such that Inst_Alloc_Subch×MPR does not exceed Alloc_Nor_BW.

10. Calculate Number of Remaining Subchannels and Update Scheduling Metric (steps 621 and 623)

If more channels remain than the allocated subchannels in step 619, the scheduler decreases the number of the remaining subchannels by that of the allocated channels in step 621. If fewer channels remain than the allocated subchannels in step 619, the number of remaining channels is 0 in step 629. In step 623, the scheduling metric is changed by updating Avg_Alloc_Subch and Avg_Alloc_BW for every MS. Scheduling is repeated with the remaining subchannels, considering the previously selected MSs also as candidates for scheduling.

Figure 9:
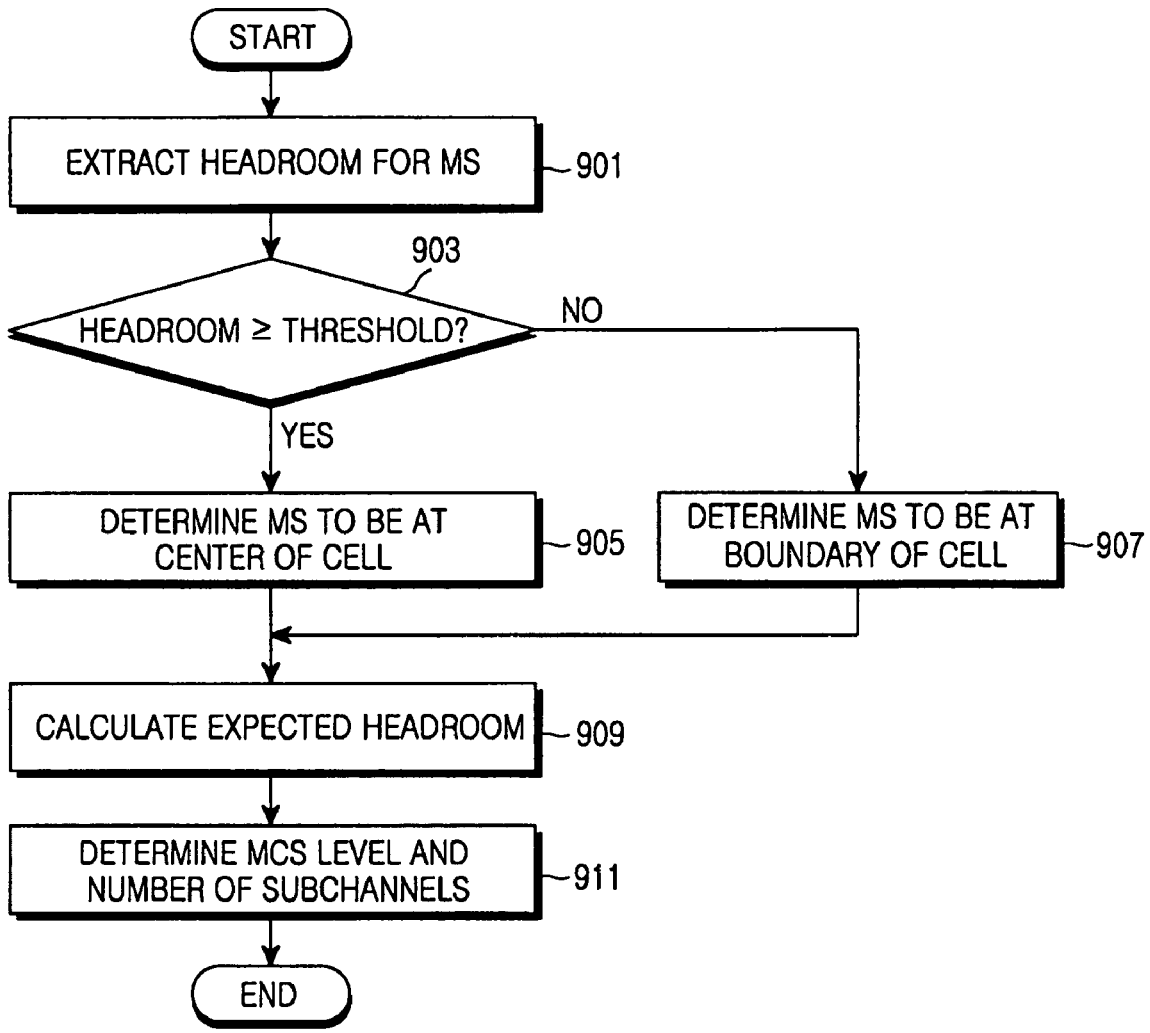
FIG. 9 is a flowchart illustrating an operation for determining an MCS level-subchannel number combination in accordance with the location of an MS in a cell in the communication system according to the present invention.

FIG. 9 is a flowchart illustrating an operation for determining an MCS level-subchannel number combination in accordance with the location of an MS in a cell in the communication system according to the present invention. The MCS level-subchannel number combination is determined based on expected headroom information, to which the present invention is not limited. Thus, the determination can be made using any other input variable instead of headroom.

Referring to FIG. 9, the scheduler extracts a headroom for an MS in step 901 and compares the headroom with a threshold set according to the communication environment or the communication system in step 903. If the headroom is greater than the threshold, the scheduler proceeds to step 905. If the headroom is less than the threshold, the scheduler proceeds to step 907.

In step 905, the scheduler determines that the MS is located at the center of the cell because the headroom is greater than the threshold. In step 907, the scheduler determines that the MS is located at the boundary of the cell because the headroom is less than the threshold.

The scheduler calculates a predicted headroom for the MS according to the location of the MS, i.e. whether the MS is located at the center of the cell or at the boundary of the cell in step 909. In step 911, the scheduler determines an MCS level and the number of subchannels according to the expected headroom.

It is highly probable that an MS with a higher headroom is located at the center of the cell, interferes less with neighbor sectors, and does not consume much power. Therefore, the headroom of the MS is extracted and compared with the threshold set according to the communication environment or the communication system. If the headroom is greater than the threshold, it is determined that the MS is located at the center of the cell and if the headroom is less than the threshold, it is determined that the MS is located at the boundary of the cell.

As described above, when an MCS level-subchannel number is selected for a normalized bandwidth allocated to the MS in the communication system, the selection is based on an expected headroom.

Also, when a normalized bandwidth equivalent to a number of subchannels N_sch_default is allocated to the MS according to the headroom of the MS, a headroom is expected for the MS and then an MCS level-subchannel number combination is finally decided according to the expected headroom.

More specifically, when the headroom is greater than the threshold and the normalized bandwidth equivalent to N_sch_default is allocated to the MS, the expected headroom is expressed as Equation (5) derived from Equation (1).

$$\text{Headroom\_exp[dB]} = \text{Headroom\_nor} - 10 \cdot \log_{10}\left(\frac{\text{N\_sel} \cdot \text{N\_sch\_default}}{MPR}\right) - (SINR_{MCS} - SINR_{QPSK, R=1/2}) \quad (5)$$

where Headroom_exp denotes the expected headroom.

Headroom_exp increases by a multiple of a normalized headroom (Headroom_nor). In other words, for an MCS level with a predetermined MPR value, the actual number of subchannels is N_sel×N_sch_default/MPR and thus Headroom_exp increases by a multiple of N_selxN_sch_default/ MPR. Also, Headroom_exp increases by the difference between a required SINR $SINR_{MCS}$ when the MCS level is allocated and the required SINR $SINR_{QPSK,R=1/2}$ for QPSK and R=½ on the basis of which the normalized headroom is calculated.

For deciding an MCS level based on the expected headroom, one common required headroom or a required headroom is set for each MCS level. Further, preference is given to a particular MCS level by differentiating the required headroom for the MCS levels.

TABLE 1

| MCS | MPR | Required headroom |
|---|---|---|
| 16QAM, R = ¾ | 3.0 | 10.0 |
| 16QAM, R = ½ | 2.0 | 8.0 |
| QPSK, R = ¾ | 1.5 | 6.5 |
| QPSK, R = ½, No rep | 1.0 | 5.0 |
| QPSK, R = ½, Rep. by 2 | 0.5 | 4.8 |
| QPSK, R = ½, Rep. by 4 | 0.25 | 4.6 |
| QPSK, R = ½, Rep. by 6 | 0.167 | 4.4 |

Table 1 illustrates an example of required headroom for respective MCS levels. Referring to Table 1, the highest of MCS levels with required headrooms less than expected headrooms is selected. If no expected headrooms are higher than the required headrooms, this implies that there is no MCS level available and thus the MPR is set to 0 and the allocated normalized bandwidth is reduced by one-half.

Figure 11:
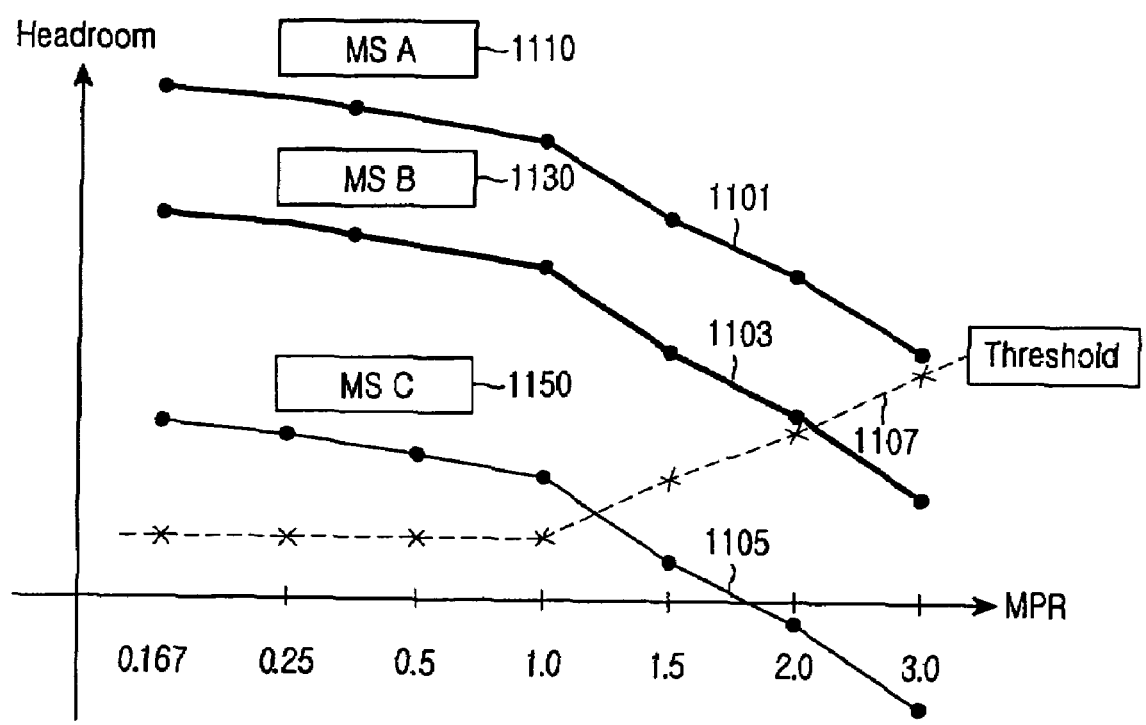
FIG. 11 illustrates headrooms, required headrooms, and determined MPRs for the MPRs of MSs in the communication system according to the present invention.

FIG. 11 illustrates headrooms, required headrooms, and determined MPRs for the MPRs of MSs in the communication system according to the present invention. The headrooms are not those of MSs 1110, 1130 and 1150 (MS A, MS B and MS C) when they are selected for scheduling at different times, not simultaneously.

Referring to FIG. 11, reference numerals 1101, 1103 and 1105 denote the MPR-based headrooms of MS A, MS B and MS C. Since power consumption decreases with MPR, the MPR-based headroom increases as the MPR decreases. For the same MPR, as headroom increases, an MS located at the center of a cell is selected. That is, MS A is located at the center of the cell and MS C is located at the boundary of the cell. Reference numeral 1107 denotes required headrooms set by the scheduler. In FIG. 11, a required headroom is small for a low MPR so that the low MPR is weighted. Therefore, an MCS level with an MPR of 3.0 is allocated to MS A, an MCS level with an MPR of 2.0 is allocated to MS B, and an MCS level with an MPR of 1.0 is allocated to MS C.

Figure 10:
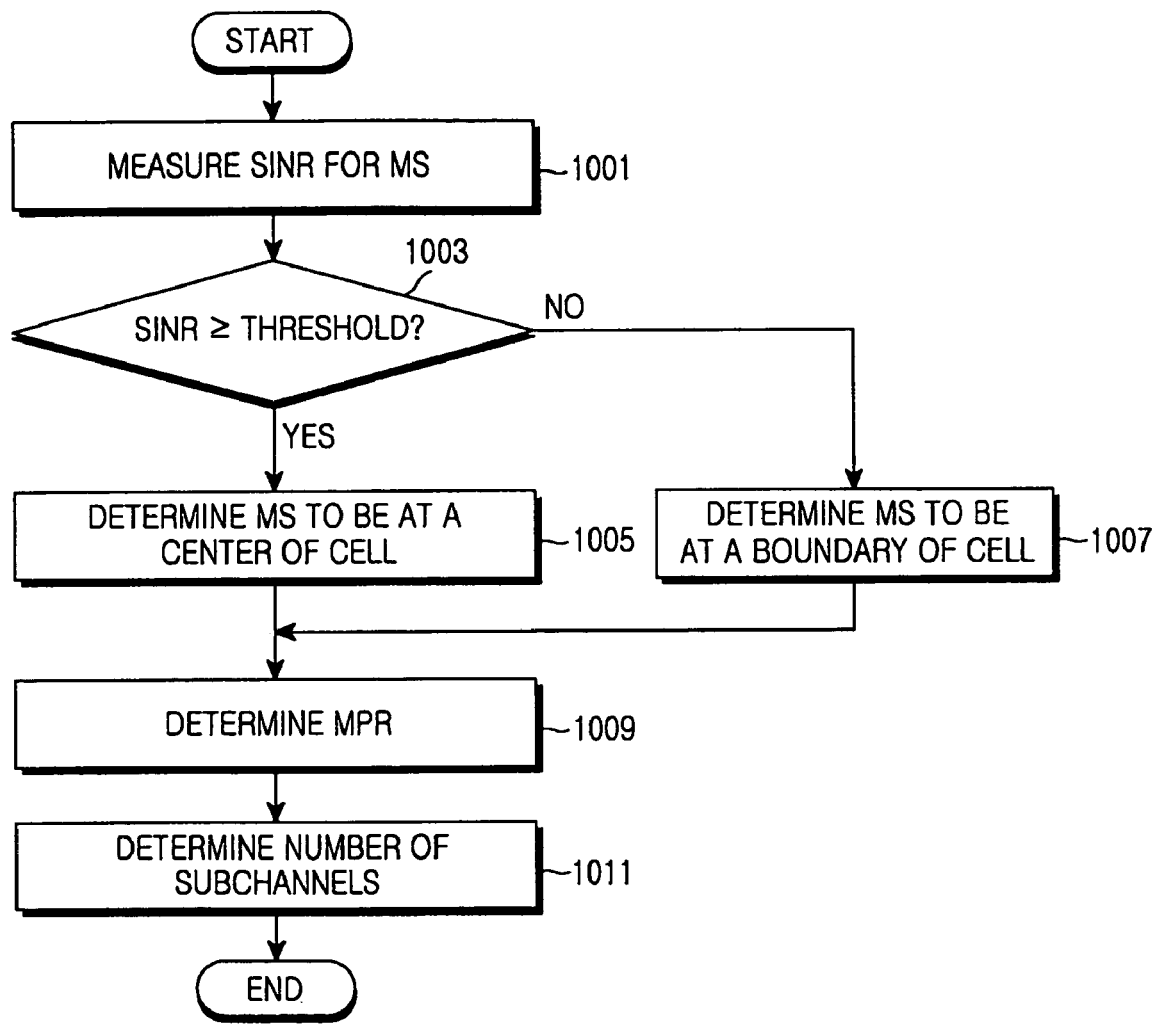
FIG. 10 is a flowchart illustrating an operation for determining an MCS level-subchannel number combination in accordance with the location of an MS in a cell in the communication system according to the present invention.

FIG. 10 is a flowchart illustrating an operation for determining an MCS level-subchannel number combination in accordance with the location of an MS in a cell in the communication system according to the present invention. The MCS level-subchannel number combination is determined based on SINR, to which the present invention is not limited. Thus, the determination can be made using any other input variable instead of SINR.

Referring to FIG. 10, the scheduler extracts an SINR for an MS in step 1001 and compares the SINR with a threshold set according to the communication environment or the communication system in step 1003. If the SINR is greater than the threshold, the scheduler proceeds to step 1005. If the SINR is less than the threshold, the scheduler proceeds to step 1007.

In step 1005, the scheduler determines that the MS is located at the center of the cell because the SINR is greater than the threshold. In step 1007, the scheduler determines that the MS is located at the boundary of the cell because the SINR is less than the threshold.

The scheduler determines an MPR according to the location of the MS, i.e. according to whether the MS is located at the center of the cell or at the boundary of the cell in step 1009 and determines the number of subchannels corresponding to the MPR in step 1011.

As illustrated in FIG. 10, the scheduler determines an MCS level-subchannel number combination for a normalized bandwidth allocated to the MS based on the average downlink SINR of the MS.

It is highly likely that an MS with a higher average downlink SINR is located at the center of the cell. Therefore, the average downlink SINR of the MS is measured and compared with the threshold set according to the communication environment or the communication system. If the average downlink SINR is greater than the threshold, it is determined that the MS is located at the center of the cell and if the average downlink SINR is less than the threshold, it is determined that the MS is located at the boundary of the cell. Then, an MCS level-subchannel number combination is finally determined for the MS according to the average downlink SINR.

More specifically, since an MS with a higher average downlink SINR is highly likely to be located at the center of the cell, the instant downlink SINR of the MS is extracted from the CQICH and its moving average is computed. An MPR is first calculated according to the moving average and the number of subchannels is determined according to the MPR. For example, when N normalized bandwidths are allocated and an MPR of p is decided, the number of required subchannels is N/p.

TABLE 2

| Average downlink SINR | Allocated MPR |
|---|---|
| 20 dB~ | 3.0 |
| 15 dB~20 dB | 2.0 |
| 10 dB~15 dB | 1.5 |
| 4 dB~10 dB | 1.0 |
| 0 dB~4 dB | 0.5 |
| −3 dB~0 dB | 0.25 |
| −6 dB~−3 dB | 0.167 |
| ~−6 dB | 0.0 |

Table 2 illustrates an example of average downlink SINRs versus MPRs. If an average downlink SINR falls within any predetermined range, an MPR corresponding to the range is allocated. As the average downlink SINR increases, the MPR also increases. If the average downlink SINR is below any predetermined range, this implies that there is no MCS level available and thus the MPR is set to 0.

In accordance with the present invention, resources are allocated according to the location of an MS in a cell in uplink scheduling in a communication system. Therefore, resources are efficiently managed. Also, an MCS level-subchannel number/bandwidth combination is selected according to the location of the MS in the cell in the uplink scheduling, thereby leading to efficient management of uplink bandwidth resources. Since the MS is located in the cell according to its power headroom or downlink SINR in the uplink scheduling and an MCS level-subchannel number/bandwidth combination is selected according to the location of the MS, the uplink bandwidth resources are efficiently managed. The efficient resource management resulting from the resource allocation based on the MS's location in the cell reduces the power consumption and neighbor cell interference of the MS. The selection of an MCS level, the number of subchannels, and a bandwidth also contributes to the decrease in the power consumption and neighbor cell interference of the MS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for allocating uplink resources in a communication system, the method comprising:
   calculating a scheduling metric for each Mobile Station (MS);
   selecting an MS with a high priority according to the scheduling metric;
   determining a Modulation order Product coding Rate (MPR) and a number of subchannels for the selected MS; and
   allocating the determined MPR and the determined number of subchannels to the selected MS and updating the scheduling metric for the each MS;
   wherein determining the MPR and the number of subchannels comprises calculating expected headrooms for Modulation and Coding Scheme (MCS) levels of the MPR for the selected MS, comparing the expected headrooms with required headrooms for the MCS levels, and allocating an MCS level with a highest MPR anion MCS levels with required headrooms less than the expected headrooms; and
   wherein the required headroom is high for an MCS level with a high MPR and a required headroom is low for an MCS level with a low MPR so that the MCS level with a high MPR is allocated to an MS with a low headroom at a boundary of a cell and the MCS level with a low MPR is allocated to an MS with a high headroom at a center of the cell.

2. The method of claim 1, wherein the scheduling metric is a criterion metric that prioritizes MSs to be allocated resources.

3. The method of claim 1, wherein determining the MPR and the number of subchannels further comprises:
   calculating an accumulated bandwidth allocated to the selected MS for a current frame;
   determining an MPR with respect to the bandwidth; and
   determining a combination of a Modulation and Coding Scheme (MCS) level and a number of subchannels corresponding to the MPR.

4. The method of claim 3, wherein determining a combination of the MCS level and the number of subchannels comprises determining the combination within a range supported by input variables according to a scheduling algorithm.

5. The method of claim 4, wherein the input variables include a headroom for each MS.

6. The method of claim 1, further comprising setting the MPR to 0 if a current allocated bandwidth cannot be supported with the determined MPR and the determined number of subchannels for the selected MS.

7. The method of claim 1, wherein determining the MPR and the number of subchannels further comprises adaptively determining a Modulation and Coding Scheme (MCS) level corresponding to the MPR and the number of subchannels according to the location of the selected MS in a cell.

8. The method of claim 7, wherein determining the MPR and the number of subchannels further comprises:
   allocating an MCS level with a high MPR to the selected MS, if the MS is located at a center of the cell; and
   allocating an MCS level with a low MPR to the selected MS, if the MS is located at a boundary of the cell.

9. The method of claim 1, wherein determining the MPR and the number of subchannels further comprises:
   determining a high required headroom for a Modulation and Coding Scheme (MCS) level with a high MPR and a low required headroom for an MCS level with a low MPR;
   calculating expected headrooms for the MCS levels;
   comparing the expected headrooms with the required headrooms for the MCS levels;
   selecting an MCS level with a highest MPR among MCS levels with required headrooms less than the expected headroom to the MS; and
   determining the number of channels according to the selected MCS level.

10. The method of claim 9, wherein the expected headroom is a headroom expected for the MS when a bandwidth equivalent to a default number of subchannels is allocated, calculated by $$\text{Headroom\_exp[dB]} = \text{Headroom\_nor} - 10 \cdot \log_{10}\left(\frac{N\_sel \cdot N\_sch\_default}{MPR}\right) - (SINR_{MCS} - SINR_{QPSK,R=1/2})$$

where Headroom_exp denotes the expected headroom, Headroom_nor denotes a power headroom when an MCS level and the number of subchannels are allocated, $SINR_{MCS}$ denotes a required Signal-to-Interference and Noise Ratio (SINR) for the MCS level, $SINR_{QPSKR,R=1/2}$ denotes a required SINR for Quadrature Phase Shift Keying (QPSK) and coding rate R=½ on the basis of which Headroom_nor is calculated, N_sel denotes a number of selections of the MS, and N_sch_default denotes a number of subchannels set by the system.

11. The method of claim 1, wherein determining the MPR and the number of subchannels further comprises:
   determining a high Signal to Interference and Noise Ratio (SINR) threshold for a Modulation and Coding Scheme (MCS) level with a high MPR and a low SINR threshold for an MCS level with a low MPR;
   extracting an SINR for the MS;
   comparing the SINR with the SINR thresholds;
   selecting an MCS level with a highest MPR among MCS levels with SINR thresholds less than the extracted SINR; and
   determining the number of subchannels according to the selected MCS level.

12. The method of claim 11, wherein extracting the SINR comprises measuring the average downlink SINR of the MS.

13. The method of claim 11, wherein determining the MPR and the number of subchannels further comprises:
   extracting an instant downlink SINR from a CHannel Quality Indicator CHannel (CQICH) and calculating a moving average of the instant downlink SINR;
   calculating an MPR based on the moving average; and
   determining the number of subchannels according to the MPR.

14. A method for allocating uplink resources in a communication system, the method comprising:
- updating input variables required for scheduling and a scheduling metric for each Mobile Station (MS) in every frame and after each individual MS allocation;
- selecting an MS maximizing the scheduling metric and allocating band resources to the selected MS;
- determining a combination of a Modulation and Coding Scheme (MCS) level and a number of subchannels corresponding to a Modulation order Product coding Rate (MPR) for the allocated band resources according to the input variables; and
- allocating the determined MCS level and the determined number of subchannels to the selected MS;
- wherein determining a combination of the MCS level and the number of subchannels comprises calculating expected headrooms for MCS levels for the selected MS corn arm the expected headrooms with required headrooms for the MCS levels, and allocating an MCS level with a highest MPR among MCS levels with required headrooms less than the expected headrooms; and
- wherein the required headroom is high for an MCS level with a high MPR and a required headroom is low for an MCS level with a low MPR so that the MCS level with a high MPR is allocated to an MS with a low headroom at a boundary of a cell and the MCS level with a low MPR is allocated to an MS with a high headroom at a center of the cell.

15. The method of claim 14, wherein the scheduling metric is a criterion metric that prioritizes MSs to be allocated resources.

16. The method of claim 14, wherein determining a combination of the MCS level and the number of subchannels further comprises:
- calculating accumulated bandwidth resources allocated to the selected MS for a current frame;
- determining an MPR with respect to the accumulated bandwidth resources; and
- determining a combination of an MCS level and a number of subchannels according to the MPR.

17. The method of claim 16, wherein determining a combination of the MCS level and the number of subchannels according to the MPR further comprises determining the combination within a range supported by input variables according to a scheduling algorithm.

18. The method of claim 14, wherein the input variables include the headroom of the MS when the MS transmits a data burst at a current MCS level and a current number of subchannels.

19. The method of claim 14, wherein the input variables include an average downlink Signal-to-Interference and Noise Ratio (SINR).

20. The method of claim 14, further comprising setting the MPR to 0 if the current allocated bandwidth resources cannot be supported with the determined MPR and the determined number of subchannels for the selected MS.

21. The method of claim 14, wherein determining a combination of the MCS level and the number of subchannels further comprises adaptively determining the MCS level and the number of subchannels according to the location of the MS in a cell.

22. The method of claim 21, wherein determining a combination of the MCS level and the number of subchannels further comprises:
- allocating an MCS level with a high MPR to the selected MS, if the MS is located at a center of the cell; and
- allocating an MCS level with a low MPR to the selected MS, if the MS is located at a boundary of the cell.

23. The method of claim 14, wherein determining a combination of the MCS level and the number of subchannels further comprises:
- determining a high required headroom for an MCS level with a high MPR and a low required headroom for an MCS level with a low MPR;
- calculating expected headrooms for the MCS levels;
- comparing the expected headrooms with the required headrooms for the MCS levels;
- selecting an MCS level with a highest MPR among MCS levels with required headrooms less than the expected headroom to the MS; and
- determining the number of channels according to the selected MCS level.

24. The method of claim 23, wherein the expected headroom is a headroom expected for the MS when a bandwidth equivalent to a default number of subchannels is allocated, calculated by $$\text{Headroom\_exp[dB]} = \text{Headroom\_nor} - 10 \cdot \log_{10}\left(\frac{N\_sel \cdot N\_sch\_default}{MPR}\right) - (SINR_{MCS} - SINR_{QPSK, R=1/2})$$

where Headroom_exp denotes the expected headroom, Headroom_nor denotes a power headroom when an MCS level and the number of subchannels are allocated, $SINR_{MCS}$ denotes a required Signal-to-Interference and Noise Ratio (SINR) for the MCS level, $SINR_{QPSK, R=1/2}$ denotes a required SINR for Quadrature Phase Shift Keying (QPSK) and coding rate R=½ on the basis of which Headroom_nor is calculated, N_sel denotes a number of selections of the MS, and N_sch_default denotes a number of subchannels set by the system.

25. The method of claim 14, wherein determining a combination of the MCS level and the number of subchannels further comprises:
- determining a high Signal to Interference and Noise Ratio (SINR) threshold for an MCS level with a high MPR and a low SINR threshold for an MCS level with a low MPR;
- extracting an SINR for the MS;
- comparing the SINR with the SINR thresholds;
- selecting an MCS level with a highest MPR among MCS levels with SINR thresholds less than the extracted SINR; and
- determining the number of subchannels according to the selected MCS level.

26. The method of claim 25, wherein extracting the SINR comprises measuring an average downlink SINR of the MS.

27. The method of claim 25, wherein determining a combination of the MCS level and the number of subchannels further comprises:
- extracting an instant downlink SINR from a CHannel Quality Indicator CHannel (CQICH) and calculating a moving average of the instant downlink SINR;
- calculating an MPR based on the moving average; and
- determining the number of subchannels according to the MPR.

28. The method of claim 14, further comprising neglecting, if the MS is selected at least twice, a previously determined MPR and number of subchannels and determining a new MPR and number of subchannels by combining band resources allocated to the MS.

29. The method of claim 14, wherein the band resources are a normalized bandwidth equivalent to the number of subchannels required to transmit a data burst at a coding rate of ½ in Quadrature Phase Shift Keying (QPSK).

30. The method of claim 14, further comprising:
   determining an MPR according to the input variables after allocating the band resources;
   comparing the determined MPR with a threshold;
   reducing the band resources to a predetermined size if the determined MPR is equal to or less than the threshold;
   comparing the determined number of subchannels with the number of remaining subchannels, if the determined MPR is greater than the threshold;
   allocating the remaining subchannels to the selected MS and setting the number of remaining subchannels to 0, if there are more remaining channels than there are allocated subchannels; and
   changing the MPR to a maximum available value with respect to the allocated number of subchannels.

31. A method for allocating uplink resources in a communication system, the method comprising:
   calculating a scheduling metric for each Mobile Station (MS);
   selecting an MS with a high priority according to the scheduling metric;
   determining a Modulation order Product coding Rate (MPR) and a number of subchannels according to a location of the selected MS in a cell; and
   allocating the determined MPR and the determined number of subchannels to the selected MS and updating the scheduling metric for the each MS;
   wherein determining the MPR and the number of subchannels comprises calculating expected headrooms for Modulation and Coding Scheme (MCS) levels of the MPR for the selected MS, comparing the expected headrooms with required headrooms for the MCS levels, and allocating an MCS level with a highest MPR among MCS levels with required headrooms less than the expected headrooms; and
   wherein the required headroom is high for an MCS level with a high MPR and a required headroom is low for an MCS level with a low MPR so that the MCS level with a high MPR is allocated to an MS with a low headroom at a cell boundary and the MCS level with a low MPR is allocated to an MS with a high headroom at a center of the cell.

32. The method of claim 31, wherein the scheduling metric is a criterion metric that prioritizes MSs to be allocated resources.

33. The method of claim 31, wherein determining the MPR and the number of subchannels further comprises:
   calculating an accumulated bandwidth allocated to the selected MS for a current frame;
   determining an MPR with respect to the bandwidth; and
   determining a combination of a Modulation and Coding Scheme (MCS) level and the number of subchannels corresponding to the MPR.

34. The method of claim 33, wherein determining a combination of the MCS level and the number of subchannel comprises determining the combination within a range supported by input variables according to a scheduling algorithm.

35. The method of claim 34, wherein the input variables include a headroom for the each MS.

36. The method of claim 31, further comprising setting the MPR to 0 if a current allocated bandwidth cannot be supported with the determined MPR and the determined number of subchannels for the selected MS.

37. The method of claim 36, wherein determining the MPR and the number of subchannels further comprises:
   allocating a Modulation and Coding Scheme (MCS) level with a high MPR to the selected MS, if the MS is located at a center of the cell; and
   allocating an MCS level with a low MPR to the selected MS, if the MS is located at a boundary of the cell.

38. The method of claim 31, wherein determining the MPR and the number of subchannels further comprises:
   determining a high required headroom for a Modulation and Coding Scheme (MCS) level with a high MPR and a low required headroom for an MCS level with a low MPR;
   calculating expected headrooms for the MCS levels;
   comparing the expected headrooms with the required headrooms for the MCS levels;
   selecting an MCS level with a highest MPR among MCS levels with required headrooms less than the expected headroom to the MS; and
   determining the number of channels according to the selected MCS level.

39. The method of claim 38, wherein the expected headroom is a headroom expected for the MS when a bandwidth equivalent to a default number of subchannels is allocated, calculated by $$\text{Headroom\_exp[dB]} = \text{Headroom\_nor} - 10 \cdot \log_{10}\left(\frac{N\_sel \cdot N\_sch\_default}{MPR}\right) - (SINR_{MCS} - SINR_{QPSK,R=1/2})$$

where Headroom_exp denotes the expected headroom, Headroom_nor denotes a power headroom when an MCS level and the number of subchannels are allocated, $SINR_{MCS}$ denotes a required Signal-to-Interference and Noise Ratio (SINR) for the MCS level, $SINR_{QPSK,R=1/2}$ denotes a required SINR for Quadrature Phase Shift Keying (QPSK) and coding rate R=½ on the basis of which Headroom_nor is calculated, N_sel denotes a number of selections of the MS, and N_sch_default denotes a number of subchannels set by the system.

40. The method of claim 31, wherein determining the MPR and the number of subchannels further comprises:
   determining a high Signal-to-Interference and Noise Ratio (SINR) threshold for a Modulation and Coding Scheme (MCS) level with a high MPR and a low SINR threshold for an MCS level with a low MPR;
   extracting an SINR for the MS;
   comparing the SINR with the SINR thresholds;
   selecting an MCS level with a highest MPR among MCS levels with SINR thresholds less than the extracted SINR; and
   determining the number of subchannels according to the selected MCS level.

41. The method of claim 40, wherein extracting the SINR comprises measuring an average downlink SINR of the MS.

42. The method of claim 40, wherein determining the MPR and the number of subchannels further comprises:
   extracting an instant downlink SINR from a CHannel Quality Indicator CHannel (CQICH) and calculating a moving average of an instant downlink SINR;

calculating an MPR based on the moving average; and
determining the number of subchannels according to the MPR.

43. An apparatus for allocating uplink resources in a communication system, the apparatus comprising:
   an input variable processor for updating input variables required for scheduling using signaling messages received in each frame and after each individual Mobile Station (MS) allocation;
   a resource amount calculator for calculating an amount of resources required for control channels according to the input variables received from the input variable processor;
   a resource allocator for determining an amount and position of resources to be allocated according to the input variables received from the input variable processor and the resource amount received from the resource amount calculator and allocating the resources to the control channels and traffic channels according to the position;
   a metric processor for calculating a scheduling metric after each individual MS allocation, that prioritizes MSs for scheduling, according to a fairness level and whether downlink channel information is utilized;
   a selector for prioritizing the MSs according to the scheduling metric and selecting an MS to be allocated resources according to the priority; and
   a subchannel number and Modulation order Product coding Rate (MPR) decider for determining the number of subchannels and an MPR for resources to be allocated to the selected MS according to the input variables received from the input variable processor;
   wherein the subchannel number and MPR decider calculates expected headrooms for Modulation and Coding Scheme (MCS) levels of the MPR for the selected MS, compares the expected headrooms with required headrooms for the MCS levels, and allocates an MCS level with a highest MPR among the MCS levels with required headrooms less than the expected headrooms; and
   wherein the subchannel number and MPR decider sets a high required headroom for a MCS level with a high MPR and a low required headroom for an MCS level with a low MPR, and allocates the MCS level with a high MPR to an MS with a low headroom at a boundary of a cell and the MCS level with a low MPR to an MS with a high headroom at a center of the cell.

44. The apparatus of claim 43, wherein the subchannel number and MPR decider calculates an accumulated bandwidth allocated to the selected MS for a current frame, determines an MPR with respect to the bandwidth, and determines a combination of a Modulation and Coding Scheme (MCS) level and the number of subchannels corresponding to the MPR.

45. The apparatus of claim 44, wherein the subchannel number and MPR decider determines the combination within a range supported by input variables according to a scheduling algorithm.

46. The apparatus of claim 43, wherein the subchannel number and MPR decider sets the MPR to 0 if a current allocated bandwidth cannot be supported with the determined MPR and the determined number of subchannels for the selected MS.

47. The apparatus of claim 43, wherein the subchannel number and MPR decider adaptively decides a Modulation and Coding Scheme (MCS) level and the number of subchannels according to a location of the selected MS in a cell.

48. The apparatus of claim 47, wherein the subchannel number and MPR decider allocates an MCS level with a high MPR to the selected MS, if the MS is located at a center of the cell, and allocates an MCS level with a low MPR to the selected MS, if the MS is located at a boundary of the cell.

49. The apparatus of claim 43, wherein the subchannel number and MPR decider determines a high required headroom for a Modulation and Coding Scheme (MCS) level with a high MPR and a low required headroom for a MCS level with a low MPR, calculates expected headrooms for the MCS levels, compares the expected headrooms with the required headrooms for the MCS levels, selects an MCS level with a highest MPR among MCS levels with required headrooms less than the expected headroom to the MS, and determines the number of channels according to the selected MCS level.

50. The apparatus of claim 49, wherein an expected headroom is a headroom expected for the MS when a bandwidth equivalent to a default number of subchannels is allocated, calculated by $$\text{Headroom\_exp[dB]} = \text{Headroom\_nor} - 10 \cdot \log_{10}\left(\frac{\text{N\_sel} \cdot \text{N\_sch\_default}}{MPR}\right) - (SINR_{MCS} - SINR_{QPSK,R=1/2})$$

where Headroom_exp denotes the expected headroom, Headroom_nor denotes a power headroom when an MCS level and the number of subchannels are allocated, $SINR_{MCS}$ denotes a required Signal-to-Interference and Noise Ratio (SINR) for the MCS level, $SINR_{QPSK,R=1/2}$ denotes a required SINR for Quadrature Phase Shift Keying (QPSK) and coding rate R=½ on the basis of which Headroom_nor is calculated, N_sel denotes a number of selections of the MS, and N_sch_default denotes a number of subchannels set by the system.

51. The apparatus of claim 43, wherein the subchannel number and MPR decider determines a high Signal-to-Interference and Noise Ratio (SINR) threshold for a Modulation and Coding Scheme (MCS) level with a high MPR and a low SINR threshold for an MCS level with a low MPR, extracts an SINR for the MS, compares the SINR with the SINR thresholds, select an MCS level with highest MPR among MCS levels with SINR thresholds less than the extracted SINR, and determines the number of subchannels according to the selected MCS level.

52. The apparatus of claim 51, wherein the subchannel number and MPR decider measure an average downlink SINR of the MS.

53. The apparatus of claim 51, wherein the subchannel number and MPR decider extracts an instant downlink SINR from a CHannel Quality Indicator CHannel (CQICH), calculates a moving average of the instant downlink SINR, calculates an MPR based on the moving average, and determines the number of subchannels according to the MPR.

54. The apparatus of claim 51, wherein if the MS is selected at least twice, the subchannel number and MPR decider neglects a previously determined MPR and number of subchannels and determines a new MPR and number of subchannels by combining band resources allocated to the MS.

55. The apparatus of claim 43, wherein the input variables include the headroom of the MS when the MS transmits a data burst at a current MCS level and a current number of sub-channels.

56. The apparatus of claim 43, wherein the input variables include an average downlink Signal-to-Interference and Noise Ratio (SINR).

* * * * *